(12) United States Patent
Postage et al.

(10) Patent No.: US 9,223,658 B2
(45) Date of Patent: Dec. 29, 2015

(54) MANAGING ERRORS IN A RAID (71) Applicant: LENOVO (Singapore) PTE, LTD., New Tech Park (SG)

(72) Inventors: Robert Brian Postage, Hillsborough, NC (US); Joaquin F. Pacheco, Cary, NC (US)

(73) Assignee: Lenovo (Singapore) PTE. LTD., Tech Park (SG)

( * ) Notice: Subject to any disclaimer, the term of this patent is extended or adjusted under 35 U.S.C. 154(b) by 271 days.

(21) Appl. No.: 13/892,640

(22) Filed: May 13, 2013

(65) Prior Publication Data

US 2014/0337667 A1   Nov. 13, 2014

(51) Int. Cl.
  *G06F 11/07*   (2006.01)
  *G06F 11/14*   (2006.01)
(52) U.S. Cl.
  CPC ........ *G06F 11/1412* (2013.01); *G06F 11/0727* (2013.01); *G06F 11/0757* (2013.01)
(58) Field of Classification Search
  CPC .................. G06F 11/0727; G06F 11/0757

USPC ........................................................ 714/6.22
See application file for complete search history.

(56) References Cited

U.S. PATENT DOCUMENTS

| | | | |
|---|---|---|---|
| 2003/0212858 A1* | 11/2003 | Apperley et al. | 711/114 |
| 2004/0190183 A1* | 9/2004 | Tamai et al. | 360/69 |
| 2005/0132103 A1* | 6/2005 | Yagisawa et al. | 710/36 |
| 2005/0198190 A1* | 9/2005 | Zavalkovsky et al. | 709/217 |
| 2005/0240681 A1* | 10/2005 | Fujiwara et al. | 710/1 |
| 2006/0277445 A1* | 12/2006 | Kano et al. | 714/42 |
| 2008/0148094 A1* | 6/2008 | Manning et al. | 714/5 |
| 2009/0235110 A1* | 9/2009 | Kurokawa | 714/3 |
| 2009/0292945 A1* | 11/2009 | Kano et al. | 714/5 |
| 2011/0185201 A1* | 7/2011 | Kawakami et al. | 713/320 |
| 2012/0054516 A1* | 3/2012 | Shayer | 713/320 |
| 2012/0151101 A1* | 6/2012 | Matsuo et al. | 710/18 |
| 2014/0281697 A1* | 9/2014 | Hsu-Hung | 714/15 |

\* cited by examiner

*Primary Examiner* — Chae Ko
(74) *Attorney, Agent, or Firm* — Kunzler Law Group (57) ABSTRACT

An apparatus, system, and method are disclosed for configuring a plurality of storage devices for a RAID and setting a time-out value for the plurality of storage devices, determining whether a response time for a storage device of the plurality of storage devices exceeds the time-out value, and recovering data from the RAID in response to the storage device exceeding the time-out value.

20 Claims, 8 Drawing Sheets

MANAGING ERRORS IN A RAID

FIELD

The subject matter disclosed herein relates to managing a RAID and more particularly relates to managing errors in a RAID.

BACKGROUND

Description of the Related Art

A RAID is generally used in the art to store data. A RAID may increase redundancy or performance by combining multiple storage devices into one logical unit. Data stored via the RAID may be distributed to the storage devices in many different ways. Various configurations may increase performance because data to be written may be distributed to many storage devices. Other configuration may increase reliability because, in some circumstances, data stored on one storage device may also be represented on another storage device. This may allow data to be recovered if one of the storage devices of the RAID fails.

Periodically, a storage device that is included in a RAID may fail. The failure may be permanent (a hard error) or temporary (a soft error). In a soft error, a storage device may attempt internal recovery algorithms to recover from the soft error. The storage device may eventually succeed, however this may cause a delay in a RAID that may be waiting for data from the storage device. Delays in a RAID may also cause a RAID controller to attempt to reset the RAID which may cause further delays.

A storage device may be configured to quit a recovery procedure if the procedure takes too long, however, this may cause more frequent hard errors, may result in a RAID controller dropping the storage device from the RAID, and may result in premature retirement of a storage device.

BRIEF SUMMARY

Based on the foregoing discussion, the inventors have recognized a need for an apparatus, system, and method that limits the potential delay caused by an error by a storage device in a RAID. Beneficially, such an apparatus, system, and method would configure the storage devices in the RAID and set a time-out value for the storage devices in the RAID. If the time-out value is exceeded by a storage device, the RAID may recover data from other storage devices in the RAID without waiting for the failing storage device to complete internal recovery procedures.

The embodiments of the present invention have been developed in response to the present state of the art, and in particular, in response to the problems and needs in the art that have not yet been fully solved by currently available RAID management technologies. Accordingly, the embodiments have been developed to provide a method, apparatus, and system for managing errors in a RAID that overcome many or all of the above-discussed shortcomings in the art.

An apparatus for managing errors in a RAID is provided including a processor, a RAID subsystem accessible by the processor, and a memory storing modules for execution by the processor. In one embodiment, the modules include a configuration module configuring a plurality of storage devices for a RAID and setting a time-out value for the plurality of storage devices. In another embodiment, the modules include a determination module determining whether a response time for a storage device of the plurality of storage devices exceeds the time-out value. In a further embodiment, the modules include a data recovery module recovering data from the RAID in response to the storage device exceeding the time-out value.

In one embodiment, the apparatus further includes a receiver module configured to receive the time-out value, the configuration module setting the received time-out value for the plurality of storage devices. In another embodiment, the receiver module receives the time-out value from a host device. In one embodiment, the RAID includes one or more of RAID 0, RAID 1, RAID 2, RAID 3, RAID 4, RAID 5, RAID 6, RAID 10, and a nested RAID.

In a further embodiment, the modules includes an adjustment module configured to adjust the time-out value in response to the determining. In another embodiment, the adjustment module is configured to increase the time-out in response to the determination module determining that one or more storage devices have exceeded the time-out value. In one embodiment, the adjustment module is configured to decrease the time-out value in response to determining that one or more storage devices have not exceeded the time-out value. In another embodiment, the configuration module sets the time-out for the plurality of storage devices by storing the time-out value in a register.

A method is also presented for managing errors in a RAID. The method in the disclosed embodiments substantially includes the steps necessary to carry out the functions presented below with respect to the operation of the described apparatus and system.

In one embodiment, the method includes configuring a plurality of storage devices for a RAID subsystem, the RAID subsystem setting a time-out value for the plurality of storage devices. The method also may include determining whether a response time for a storage device exceeds the time-out value. In a further embodiment, the method includes recovering data from the RAID in response to the storage device exceeding the time-out value.

In one embodiment, the method includes receiving the time-out value. In a further embodiment, the method includes, receiving the time-out value from a host device, or from a storage controller. In another embodiment, the method includes counting a number of times a storage device exceeds the time-out value, and removing the storage device from the RAID in response to determining that the number of times the storage device has exceeded the time-out value is above a threshold value.

In one embodiment, the method includes replacing a storage device that exceeds the time-out value one or more times. In another embodiment, the method includes adjusting the time-out value in response to the determining whether one or more storage devices of the plurality have exceeded the time-out value. In one embodiment, in response to determining that one or more of the storage devices have exceeded the time-out value, the method includes increasing the time-out value. In another embodiment, in response to determining that one or more storage devices have not exceeded the time-out value, the method includes, decreasing the time-out value. In one embodiment, the method includes setting the time-out value by storing the time-out value in a register of one or more of the storage devices.

A system is also presented to manage errors in a RAID. In particular, the system, in one embodiment, includes a plurality of storage devices forming a RAID. In another embodiment, the storage devices are configured to receive a time-out value, the time-out value limiting internal recovery procedures for the storage devices. In one embodiment, the system includes a storage controller for controlling the RAID. In a further embodiment, the storage controller is configured to set a time-out value for the storage devices. In one embodiment, the storage controller is further configured to recover data from the RAID in response to one or more storage devices exceeding the time-out value. In another embodiment, the system includes a system memory. In one embodiment, the system includes one or more processors in communication with the storage controller and transferring data to the system memory.

In one embodiment, the storage controller is configured to receive the time-out from one of a host device, a module, a driver, a controller, an operating system, and an application. In another embodiment, the storage controller is further configured to set the time-out value for the storage devices by storing the time-out value in a register of respective storage devices.

A program product is presented including a computer readable storage medium. In one embodiment, the storage medium includes machine readable code executable by a processor, the code comprising many operations. In one embodiment, the operations include configuring a plurality of storage devices for a RAID subsystem, the RAID subsystem setting a time-out value for the plurality of storage devices. In another embodiment, the operations include determining whether a response time for a storage device of the plurality of storage devices exceeds the time-out value. In a further embodiment, the operations include recovering data from the RAID in response to the storage device exceeding the time-out value.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a machine readable signal medium or a storage device. The computer readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

A redundant array of independent disks (RAID), or a redundant array of inexpensive disks (RAID) combines multiple storage devices into one or more logical units that can be operated as a one or more logical storage areas. As described here, a "RAID" is meant to include a variety of RAID subsystems. RAID subsystems may include storage devices, one or more controllers, an enclosure, interfaces to other devices, a network controller, or the like. A controller may be primarily hardware and may include a processor and memory. In another embodiment, a controller may be primarily software, and may operate a software RAID based on two or more storage devices available to a computing system that may access the storage devices. Although the RAID acronym includes use of "disks," this disclosure is not meant to be limited in this regard. As disclosed, the methods, systems, and apparatuses described herein are meant to include use of all kinds of storage devices, or the like.

Storage Devices, as used herein, is meant to include all storage technologies, and to be developed storage technologies. Storage devices may include, hard drives, floppy drives, compact disks, magnetic tape drives, disk cartridge drives, flash based devices, solid state devices, cloud based storage or to be developed storage technologies, or other, or the like.

As described herein, a RAID may virtualize storage by combining multiple storage devices into one logical unit, such that the RAID may appear as though it is one storage device. A RAID may provide some protection against storage devices that may fail because a RAID controller may reconstruct data from the failing device based on data stored on other devices in the RAID. There are several different methods for providing this protection.

In one example, a RAID may be configured to stripe at a block level across multiple storage devices (RAID 0). This may provide some performance benefits, but would not provide fault tolerance because data stored on a RAID 0 is not duplicated on other storage devices of the array.

In another example, a RAID may be configured to mirror data between storage devices (RAID 1). For example, in a RAID 1, data written to one storage device may be duplicated to a second storage device. If the one of the storage devices in a RAID 1 fails, the data may be loaded from another storage device of the RAID 1.

In another example, a RAID may be configured to stripe data at the bit level and provide parity (RAID 2). In another example, a RAID may be configured to stripe data at a byte level and provide dedicated parity (RAID 3). In a RAID 3, storage devices may be synchronized so that data may be sequentially striped on different storage devices of the RAID. Parity may be calculated across corresponding bytes and storage on a dedicated parity storage device. In this example, if a storage device fails, the data may be reconstructed using the remaining data storage devices and the parity storage device.

In another example, a RAID may be configured to block-level stripe across multiple storage devices and include parity (RAID 4). In this configuration, a dedicated parity storage device may be used. Writing at a block level may allow input/output requests to be performed in parallel because each storage device may be operated independently.

In another example, a RAID may be configured to block-level stripe and may distribute parity across the data storage devices of the RAID (RAID 5). In this configuration, the parity may be distributed with the associated data. In this example, a storage device of the RAID may fail, and the data may be reconstructed based on the other storage devices in the RAID.

In another example, a RAID may be configured to block-level stripe and include double distributed parity (RAID 6). In this example, the RAID may provide fault tolerance up to two failed storage devices. In other configurations, a RAID may include various combinations of striping and mirroring. In one example, a RAID may stripe data across multiple primary storage devices, and then minor the primary storage devices to secondary storage devices. May other combinations of the previously defined RAID configurations may be done. RAID configurations may include the configurations previously described, or may include nested configurations, or hybrid RAIDs. In a nested RAID, multiple secondary RAIDs may operate as storage devices for a primary or "top" RAID controller. This disclosure is meant to include all such configurations, or other, or the like.

A RAID may be implemented using hardware, firmware, software, or other, or the like. A software implementation may be as part of an operating system, device driver, or the like. In one example of a software based RAID, a virtual device may abstract multiple storage devices. In another example, a logical volume manager may manage a RAID. In another example, a component of a file system may operate a RAID.

Descriptions of Figures may refer to elements described in previous Figures, like numbers referring to like elements.

Figure 1:
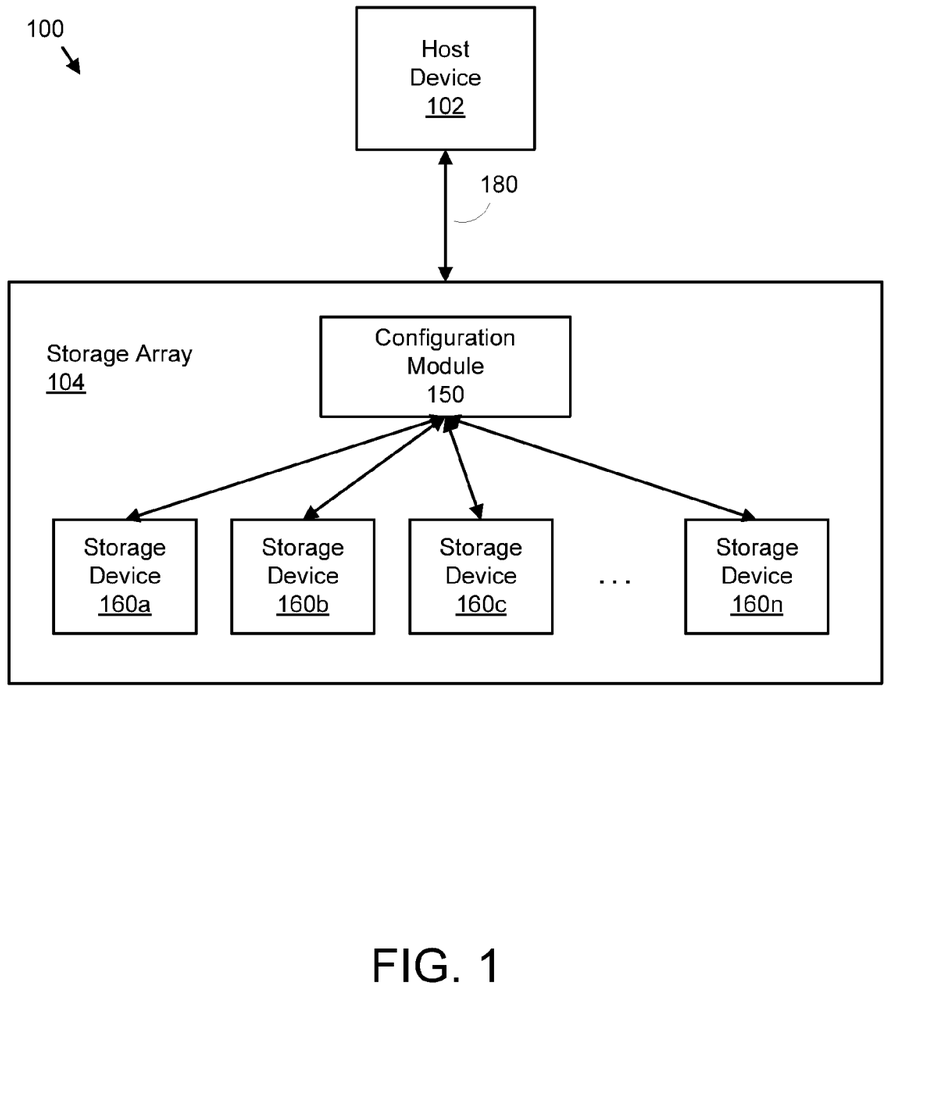
FIG. 1 is a schematic block diagram illustrating one embodiment of a system for managing errors in a RAID.

FIG. 1 depicts one embodiment of a system 100 for managing errors in a RAID. In one embodiment, the system includes a host device 102. A host device 102 may include a wide variety of computing devices, or host systems capable of communicating with a RAID. A Host Device 102 may include a processor, memory, storage, peripherals, or the like. In one embodiment, a Host Device 102 may be a desktop system, a laptop system, a tablet, a handheld, a cellular device, or the like. In another embodiment, a Host Device 102 may be a general purpose computer configured to execute specialized software instructions to accomplish the methods described herein.

The host device 102 may communicate with the storage array 104 using many different physical connections or communication protocols. For example, the host device 102 may communicate with the storage array via USB, SCSI, ATA, serial protocols, SATA, serial attached SCSI (SAS), network protocols such as TCP, IP, network attached storage (NAS), or other, or to be developed techniques, or the like.

In one embodiment, the system 100 may include a storage array 104. The storage array 104, may include a configuration module 150, and one or more storage devices 160. Although FIG. 1 depicts storage devices 160a through 160n, this disclosure is not limited in this regard. In one example, 'n' may represent the $100^{th}$ storage device. Therefore a storage array 104 may include hundreds of storage devices or more. The storage array 104 may include many storage devices 160 configured in any of the previously described RAID configurations. In one embodiment, the storage array 104 may include storage devices 160 that are the same brand, make, size or model. In another embodiment, the storage array 104 may include storage devices 160 that are not the same brand, make, model, or size. In one embodiment, the storage array 104 may include an odd number of storage devices 160, or an even number of storage devices 160. In another embodiment, the storage array 104 may include storage devices 160 that are not currently being used to store data.

In one embodiment, the configuration module 150 may be configured to configure many storage devices for a RAID and set a time-out value for the storage devices. The configuration module 150 may configure the storage devices 160 in any of the previously described RAID configurations. In one example, the configuration module 150 may set a time-out value for each of the storage devices in the RAID by storing the time-out value in a register of the storage devices 160. In another example, the configuration module 150 may store a time-out value in a memory of the configuration module 150. In one example, the time-out value may be 7 seconds, or less. In another embodiment, the time-out value may be less than a default time-out value of a storage device 160. The time-out value may be updated in response to errors by a storage device in the RAID, or other events associated with a RAID, or RAID subsystem.

In another embodiment, the configuration module 150 may determine whether a response time for a storage device in the RAID exceeds the time-out value. For example, the configuration module 150 may measure a response time for a storage device 160 of the storage array 104. In one example, the response time may be a time difference between the current time and a time when a read command had been issued. If the time difference between the current time and the time when the read command was issued is greater than the specified time-out value, the configuration module 150 may determine that the response time for the storage device 160 exceeds the time-out value. If the time difference between the current time and the time when the read command was issued is less than the specified time-out value, the configuration module 150 may determine that the response time for the storage device 160 does not exceed the time-out value.

In response to determining that the response time for the storage device 160 exceeds the time-out value, the configuration module 150 may recover or reconstruct data in the storage array 104. In one example, the configuration module 150 may request associated data from another storage device 160 in the RAID. In another example, the configuration module 150 may reconstruct the requested data by combining data from other storage device 160 with a parity storage device, as previously described regarding a RAID 4 configuration.

In one embodiment, the configuration module 150 may adjust the time-out value in response to determining whether one or more storage devices 160 have exceeded the time-out value. In one example, in response to each of the storage devices 160 exceeding the time-out value, the configuration module 150 may increase the time-out value. In another example, in response to none of the storage devices 160 exceeding the time-out value, the configuration module 150 may decrease the time-out value.

In another embodiment, the configuration module 150 may determine if a percentage of storage devices have exceeded the time-out value, and may increase the time-out value in response to a high percentage of storage devices exceeding the time-out value. For example, if 70% or more of the storage devices have exceeded the time-out value, the configuration module 150 may increase the time-out value. In one embodiment, the configuration module 150 may determine if a low percentage of storage devices have exceeded the time-out value. For example, if 10% of fewer of the storage devices 160 in a RAID have exceeded the time-out value, the configuration module 150 may decrease the time-out value. Decreasing the time-out value of the storage devices 160 of the RAID may increase the performance of the RAID.

In one example, the storage array 104 may include two storage devices 160a, 160b, in a RAID 1 configuration. The configuration module 150 may indicate that storage device 160a is a primary storage device, and storage device 160b is a secondary storage device. This RAID configuration may be referred to as 'mirroring' because the data being stored on storage device 160a is duplicated or 'mirrored' onto storage device 160b. In a scenario where storage device 160a fails to return data requested by the host device 102, the configuration module 150 may subsequently request the backup or 'mirrored' data to be returned from the storage device 160b.

In one example, the storage device 160a may experience a soft error and may initiate internal recovery procedures in order to retry to read the requested data. As described herein, a soft error may include a storage device 160 that fails to read a specific address may report a soft error and try again to read the data at the specified address. A storage device may report a soft error during execution of internal recovery procedures. A soft error may also indicate a data read that may be inconsistent with parity information for the storage device 160 or the storage array 104, depending on the location of the storage information and the RAID configuration. A soft error does not necessarily indicate a hardware failure. A soft error may or may not indicate any decrease in reliability or indicate any likelihood of future errors.

In addition to a soft error, a storage device may experience a hard error. A described herein, a hard error may indicate failure of a physical component. A storage device 160 that returns a hard error may or may not have already failed. Rectification of a hard error may include replacement of the failed component, physical repair, or the like. A RAID may include unused storage devices. Therefore, a RAID controller may replace a storage device 160 that returns a hard error by removing the storage device 160 from the RAID and replacing the storage device 160 with an unused storage device in the RAID. In another embodiment, a user may exchange the storage device 160 that returned a hard error with another storage device 160, and a RAID subsystem may rebuild the data on the RAID using the exchanged storage device 160, thereby replacing the storage device 160.

If a storage device 160 returns a hard error, this may indicate that the storage device is no longer trying to read the requested data. In response to receiving a hard error from a storage device, the configuration module 150 may immediately remove the storage device 160 from the storage array 104.

After experiencing a soft error, a storage device 160 may initiate internal recovery procedures. In one example, the recovery procedures for the storage device 160a may exceed 30 seconds. In an example, where the configuration module 150 had set a time-out value at 7 seconds, the storage device 160a may return after 7 seconds instead of continuing recovery procedures after the time-out value. In response to the primary storage device 160a returning (giving up), the configuration module 150 may request the backup data from the secondary storage device 160b. In this way, the configuration module 150 may recover data from the RAID in response to the storage device 160a exceeding the time-out value.

In one example, the storage array 104 may include three storage devices 160a, 160b, and 160c, in a RAID 5 configuration. The configuration module 150 may distribute data and parity information to the three storage devices 160a, 160b, 160c. In a scenario where storage device 160a fails to return data requested by the host device 102

In one example, the storage device 160a may fail to return requested data and may initiate internal recovery procedures in order to retry to read the requested data. The recovery procedures for the storage device 160a may exceed 30 seconds. In an example, where the configuration module 150 had set a time-out value at 8 seconds, the storage device 160a may return after exceeding 8 seconds instead of continuing recovery procedures. In response to the primary storage device 160a failing to return the requested data, the configuration module 150 may reconstruct the requested data using associated data and parity information from storage devices 160b and 160c, as one skilled in the art would recognize.

In another example, the storage device 160a may fail and continue internal recovery procedures past a time-out value of 8 seconds. In response to the storage device 160a not responding to a data operation, the configuration module 150 may reconstruct the requested data using associated data and parity information from storage devices 160b and 160c, as one skilled in the art would recognize. The storage device 160a may or may not be notified that the configuration module had reconstructed the data. In an example where the storage device 160a subsequently returns from a read request after the configuration module 150 had reconstructed the requested data from the other storage devices 160b, 160c, the configuration module 150 may ignore the returned data.

In one embodiment, the configuration module 150 may manage the storage devices 160 of the storage array 104. For example, in response to errors from a storage device 160, the configuration module 150 may remove the storage device 160 from the participation in the data storage of the storage array 104. In another embodiment, the configuration module 150 may notify a host device 102 that a storage device 160 has been removed from participation in the data storage of the storage array 104. In one embodiment, a configuration module 150 may add a storage device 160 to the storage array 104. In one example, a storage device 160a may report one or more data errors. In response to the errors, the configuration module 150 may remove a storage device 160 from the storage array 104. A user of the system 100 may replace the removed storage device 160 with another storage device 160. In response to a replacement storage device 160, the configuration module 150 may include the storage device 160 in the data storage of the storage array 104.

The configuration module 150 may include the storage device 160 in the storage array 104 by rebuilding the data for the added storage device. For example, in a RAID 1 configuration, the storage device 160a exceed the time-out value one or more times. The configuration module 150 may remove the storage device 160a from participation in the storage array 104. A user may replace a storage device 160a with another storage device 160a with another storage device 160b. The configuration module 150 may include the storage device 160c and rebuild the data for the storage array 104 by copying, or 'mirroring,' the data from the storage device 160b of the storage array 104 to the storage device 160c.

In another example, in a RAID 5 configuration, storage devices 160a, 160b, and 160c may participate in the data storage for the storage array 104. Storage device 160a may exceed the time-out value one or more times. The configuration module 150 may remove the storage device 160a from participation in the storage array 104. A user may replace a storage device 160a with another storage device 160n. The configuration module 150 may include the added storage device 160n and rebuild the data for the storage array 104 by reconstructing the data using data and parity information from storage devices 160b and 160c.

In one embodiment, the configuration module 150 count a number of times a storage device 150 exceeds the time-out value. The configuration module 150 may remove a storage device 160 from participation in the storage array 104 after the storage device 160 has exceeded the time-out value a number of times beyond a threshold count value. For example, the storage device 160a may exceed the time-out value 20 times and the configuration module 150 may not remove the storage device 160 from participation in the storage array 104. In another example, the storage device 160 may exceed the time-out value more than 20 times and the configuration module 150 may remove the storage device 160 from participation in the storage array 104. In addition to exceeding the time-out value a number of times, a storage device 160 may be removed from the storage array 104, by the configuration module 150, for other reasons, including, but not limited to, hard errors, soft errors, power failures, or the like.

Figure 2:
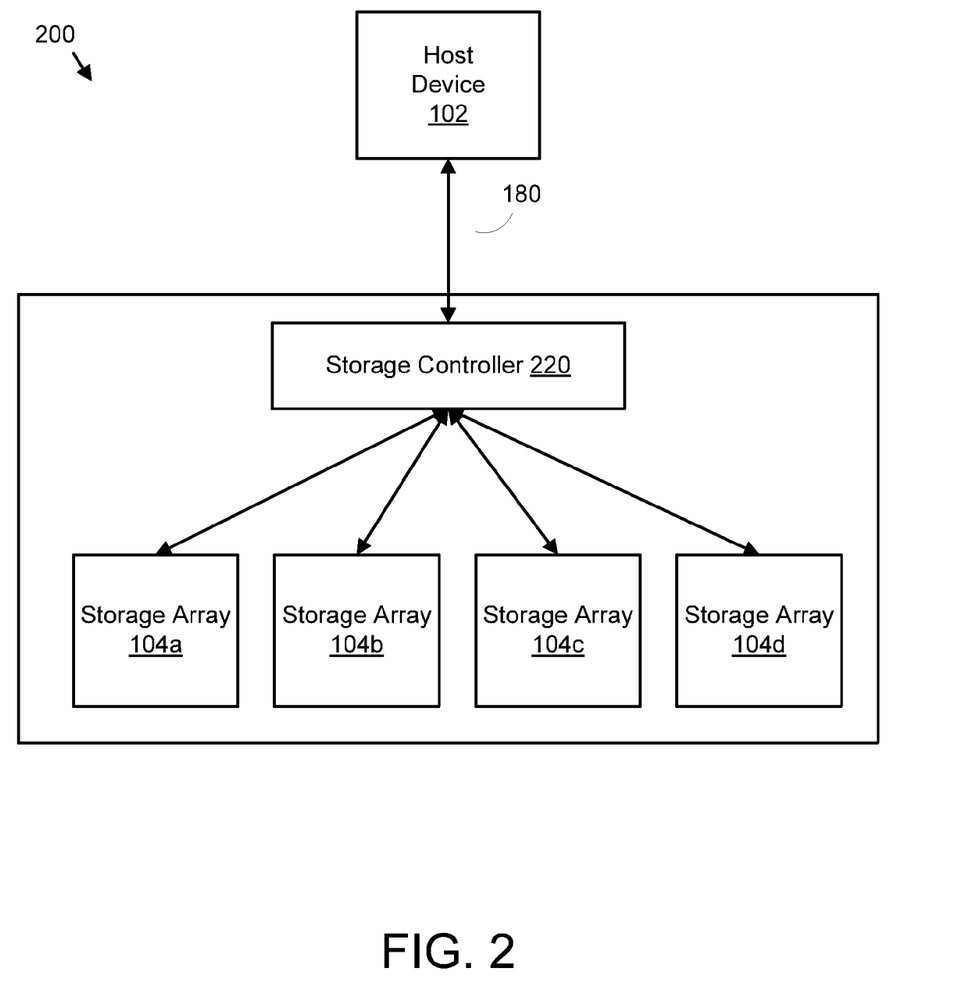
FIG. 2 is a schematic block diagram illustrating one embodiment of a system for managing errors in a RAID.

FIG. 2 is a schematic block diagram illustrating one embodiment of a system 200 for managing errors in a RAID. In one embodiment, the system 200 may include a host device 102, a storage controller 220, a plurality of storage arrays 104, and a connection 180 between the host device 102 and a storage controller 220. The host device 102 and storage arrays 104 may or may not substantially similar to those depicted in FIG. 1. In this system 200, the storage arrays 104 operate as storage devices 160 (FIG. 1). Although each of the storage arrays may be configured as RAIDs, the storage controller 220 may operate a primary raid, with the storage arrays 104 being the storage devices of the RAIDs.

In one embodiment, the storage arrays 104 may each be configured as similar RAID types. For example, storage arrays 104a, 104b, 104c, and 104d may each be configured as RAID 1. Of course, other RAID configurations may be used, and therefore, this disclosure is not limited in this regard. The RAID configurations between the various storage arrays 104 may or may not be similar. In one embodiment, the storage controller 220 may operate a primary RAID where the storage arrays 104 operate as independent storage devices. This may be referred to as a nested RAID.

In one embodiment, the storage controller 220 may include a configuration module 150. As previously described regarding a configuration module 150, the storage controller 220 may configure the storage arrays 104 and set a time-out value for the plurality of storage arrays 104 (as storage devices). The storage controller 220 may determine whether a response time for a storage array 104 exceeds the time-out value, and may recover data from the primary RAID in response to a storage array 104 exceeding the time-out value, as previously described.

One example, the storage controller 202 may configure storage array 104a and storage array 104b as a RAID 1. The storage controller 202 may set a time-out value of 8 seconds for the storage arrays 104a,104b. The storage controller 202 may determine whether a response time for a storage array 104a,104b exceeds the time-out value. For example, the storage controller 202 may determine that storage array 104a has exceeded the response time of 8 seconds. The storage controller 202 may recover data from the primary RAID in response to the storage array 104a exceeding the time-out value, by requesting associated data from storage array 104b.

In another embodiment, each storage array 104 includes a configuration module 150. In one embodiment, each configuration module 150 of respective storage arrays 104 may be configured with a similar time-out value. In another embodiment, each configuration module 150 of respective storage arrays 104 may be configured with different time-out values. In another embodiment, the storage controller 220 may configure a time-out value and communicate the time-out value to each of the storage arrays 104. Respective storage arrays 104 may configure storage devices 160 with the received time-out value.

Figure 3:
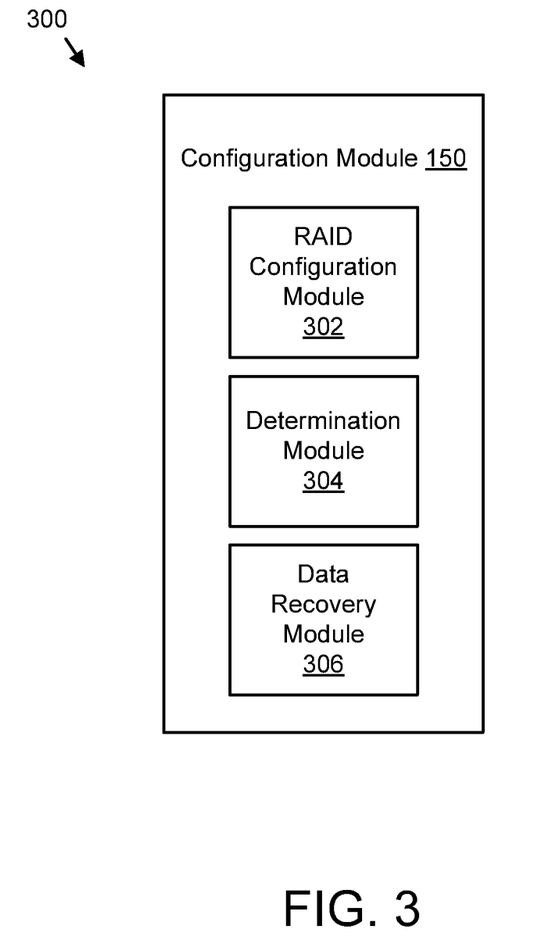
FIG. 3 is a schematic block diagram illustrating one embodiment of a configuration module.

FIG. 3 is a schematic block diagram illustrating one embodiment 300 of a configuration module 150. In one embodiment, the configuration module 150 includes a RAID configuration module 302, a determination module 304, and a data recovery module 306. The RAID configuration module 302, the determination module 304, and the data recovery module 306 may perform similar functions as the configuration module 150 described relative to FIGS. 1 and 2.

In one embodiment, A RAID configuration module 302 may configure a RAID based on two or more storage devices 160. A RAID configuration may be any of the RAID configurations previously described. A RAID configuration module may set a time-out value for the storage devices of a storage array 104. A RAID configuration module 302 may count a number of times a storage device 160 exceeds a time-out value. A RAID configuration module 302 may remove a storage device from the RAID. A RAID configuration module 302 may add a storage device to the RAID. A RAID configuration module 302 may modify a RAID configuration.

In one embodiment, a determination module 304 may determine if a storage device 160, or a storage array 104 has exceeded a time-out value. A determination module 304 may receive the time-out value from the RAID configuration module 302. A determination module 304 may measure a time different between a current time, and a time when a storage operation was requested. If the current time minus the time when a storage operation was requested is greater than the time-out value, the determination module 304 may determine that the storage device 160 (that was requested to perform the operation) had exceed the time-out value. A determination module 304 may indicate to the configuration module 302 that the storage device 160 had exceeded the time-out value.

In one embodiment, a data recovery module 306 may, depending on the RAID configuration, either recover data or reconstruct requested data. For example, in a RAID 1 configuration, in response to the determination module 304 determining that storage device 160a had exceeded a time-out value, a data recovery module 306 may request associated data on storage device 160b, as previously described. In another example, in a RAID 5 configuration, in response to the determination module 304 determining that storage device 160a had exceeded a time-out value, a data recovery module 306 may reconstruct data using data and parity information on storage devices 160b, and 160c, as previously described regarding FIG. 1.

Figure 4:
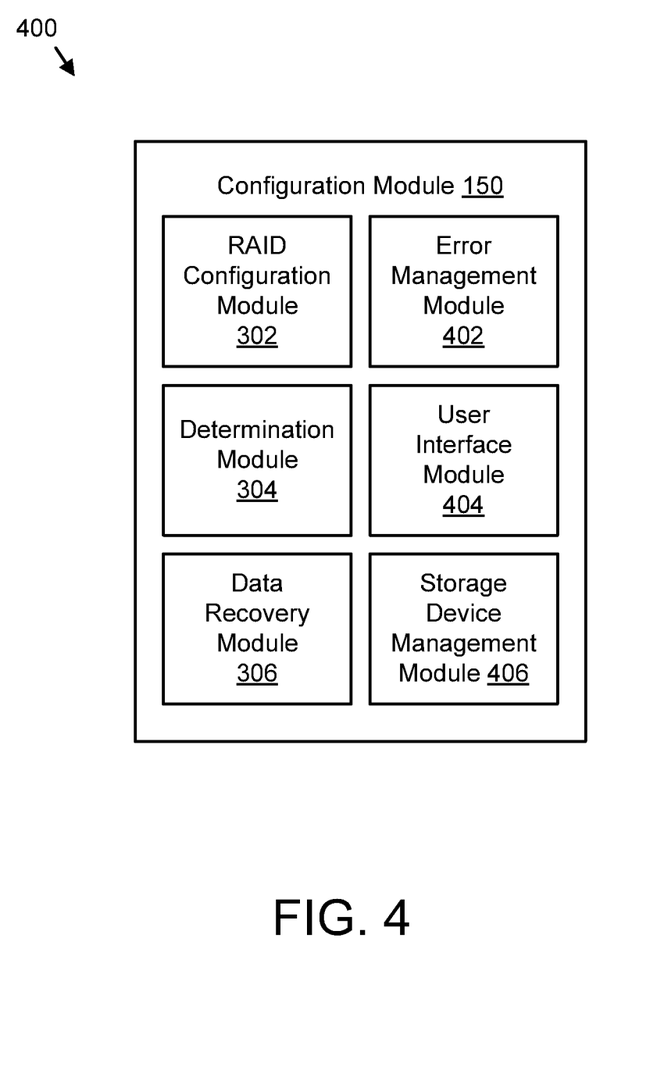
FIG. 4 is a schematic block diagram illustrating another embodiment of a configuration module.

FIG. 4 is a schematic block diagram illustrating another embodiment 400 of a configuration module 150. In this embodiment 400, a configuration module 150 may include a RAID configuration module 302, a determination module 304, a data recovery module 306, an error management module 402, a user interface module 404, and a storage device management module 406. The RAID configuration module 302, the determination module 304 and the data recovery module 306 may or may not perform similar functions as those depicted in FIG. 3.

In one embodiment, an error management module 402 may receive notification from a determination module 304 when a storage device 160 exceeds a time-out value. An error management module 402 may track when storage devices 160 exceed a time-out value. An error management module 402 may receive a threshold count for determining when a storage device should be removed from the RAID. Each time a storage device 160 exceeds a time-out value, the determination module may notify the error management module 402. The error management module may compare a current count of time-out violations. If the number of time-out violations for a specific storage device exceeds a threshold count, the error management module 402 may notify a RAID configuration module 302 that the offending storage device should be removed from the RAID. The RAID configuration module 302 may remove the storage device 160 from the RAID as previously described.

In another embodiment, an error management module 402 may track hard errors of a storage device 160. As previously described regarding a soft error, an error management module 402 may receive a threshold count of hard errors for determining when a storage device should be removed from the RAID. In one example, an error management module 402 may indicate that a storage device 160 should be removed from the RAID after one hard error. In another example, an error management module 402 may indicate that a storage device 160 should be removed from the RAID after 10 or more hard errors.

In one embodiment, a user interface module 404 may receive a time-out value from a host device 102. A host device 102 may receive a time-out value from a user and forward the received time-out value to a storage controller 202, or a user interface module 404. A user interface module 404 may store the time-out value. A user interface module 404 may forward a received time-out value to a RAID configuration module 302, or other module.

In another embodiment, a user interface module 404 may receive an indicator. The indicator may be a numeric value such as a Boolean, an Integer, a Floating Point number, or the like. An indicator may indicate that a RAID should be configured with a time-out value. In another embodiment, an indicator may indicate that a time-out value should not be used with a RAID. For example, an indicator having a value of 0 may indicate that a time-out value should not be used for a specific RAID configuration. In another example, a value other than 0 may indicate that a RAID should be configured with a time-out value.

In one embodiment, a default value of a time-out may be set by a configuration module 150. An indicator received from a user interface module 404 may enable or disable the default time-out value. In one example, a configuration module 150 may set a default time-out value of 8 seconds. A configuration module 150 may receive an indicator that enables the default time-out value. For example, an indicator having a value of one may indicate that the RAID should be configured with a default time-out value of 8 seconds. In another example, a configuration module 150 may receive an indicator that disables the default time-out value. For example, an indicator having a value of zero may indicate that the RAID should not be configured to use the default time-out value of 8 seconds.

In one embodiment, a storage device management module 406 may remove storage devices 160 from participation in data storage for the RAID, as previously described regarding the RAID configuration module. In another embodiment, a storage device management module 406 may include additional devices in the RAID configuration. For example, if a storage device had been removed from a RAID because of errors, a user may replace the storage device with errors and the storage device management module 406 may include the storage device in the current RAID configuration.

In one embodiment, a storage device management module 406 may modify a role of a storage device in a RAID configuration. For example, in a RAID 1 configuration, a storage device management module 406 may change the role of a primary storage device to a backup storage device. In another example, in a RAID 1 configuration, a storage device management module 406 may change the role of a backup storage device to a primary storage device. As described herein, a primary storage device for a RAID 1 configuration includes a default storage device. As described herein, a backup or a secondary storage device for a RAID 1 configuration includes the storage device that may be 'mirroring' the primary storage device. In another example, in a RAID 4 configuration, a storage device management module 406 may modify a data storage device 160 to a dedicated parity storage device 160.

In another embodiment, a storage device management module 406 may manage how time-out values are set for different storage devices 160 of a storage array 104. For example, in a RAID 1 configuration, a storage device management module 406 may set a time-out value for storage device 160a by storing a time-out value in a register or memory of the storage device 160a. In this example, the storage device 160a may terminate internal recovery procedures after exceeding the time-out value. In another example, a storage device management module 406 may set a time-out value in a register or memory of the storage device management module 406. In this example, a storage device management module 406 may notify a RAID configuration module 302 if a storage device exceeds the time-out value and the RAID configuration module 302 may reconstruct the requested data before the storage device 160 returns from a storage operation.

Figure 5:
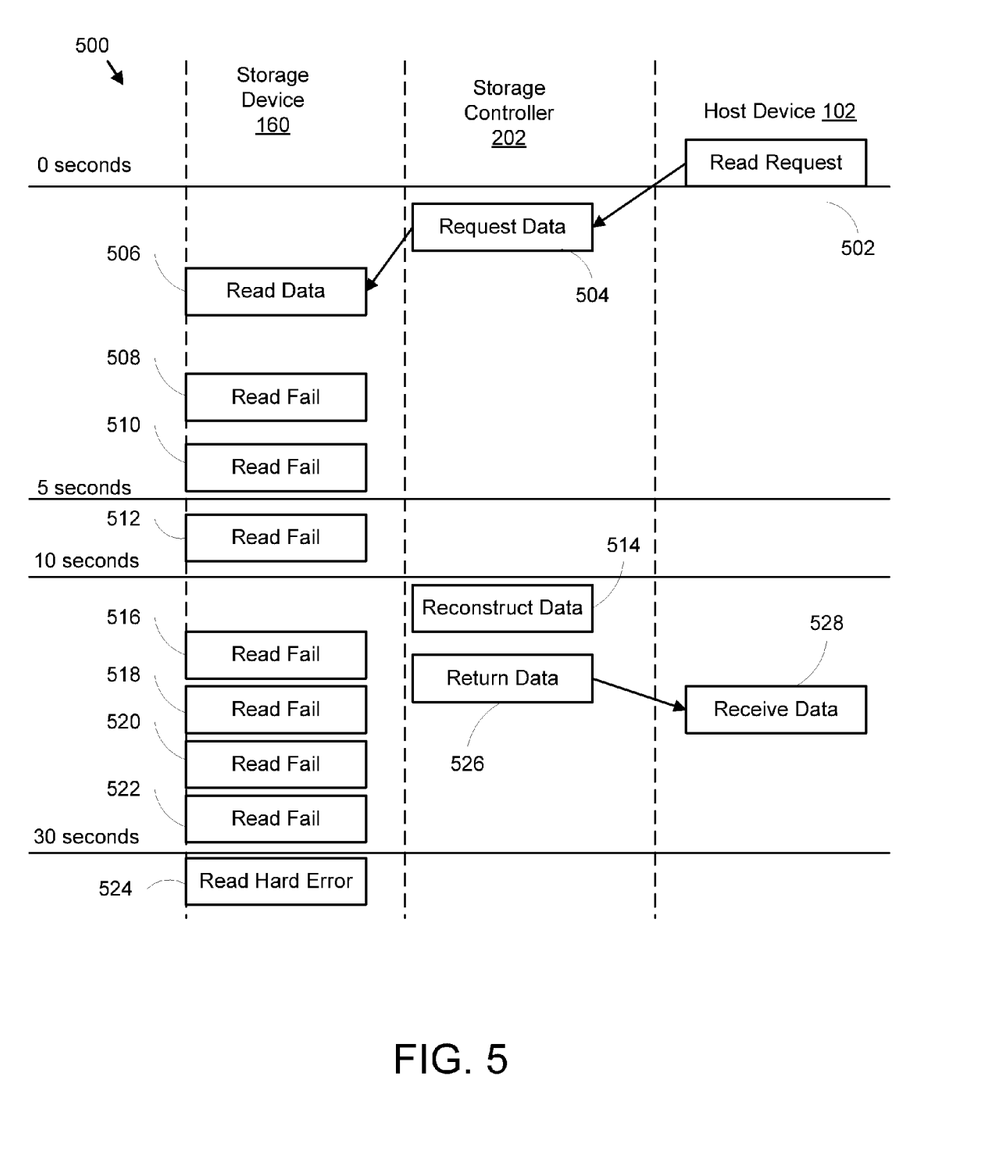
FIG. 5 is a schematic timeline diagram illustrating one method for managing errors in a RAID.

FIG. 5 is a schematic timeline diagram illustrating one method 500 for managing errors in a RAID. In one embodiment 500, at a time index of 0 seconds, a host device 102 may request data 502 at a storage controller 202. In response to a read request 502, the storage controller 202 may request 504 data from a storage device 160. The storage device 160 may attempt to read 506 the requested data. The read may fail, one or more times 508, 510. Internal recovery procedures for the storage device 160 may take 30 seconds or longer. After 5 seconds, a storage device 160 may still be executing internal data recovery procedures. In one embodiment, a time-out value of 10 seconds may have been set by a configuration module 150. In consequence of the storage device 160 not returning the requested data before the time-out value of 10 seconds, the storage controller 202 may reconstruct 514 the requested data from other storage devices of the RAID. The storage controller 202 may return 526 the reconstructed data to the host device 102. The host device 102 may receive 528 the requested data. After the 10 second time-out period, the storage device 160 may still be executing internal recovery procedures and may continue one or more attempts to read the requested data (516, 528, 520, 522). After 30 seconds, the storage device may issue 524 a hard read error. The storage controller 202 may or may not respond to the hard read error.

Figure 6:
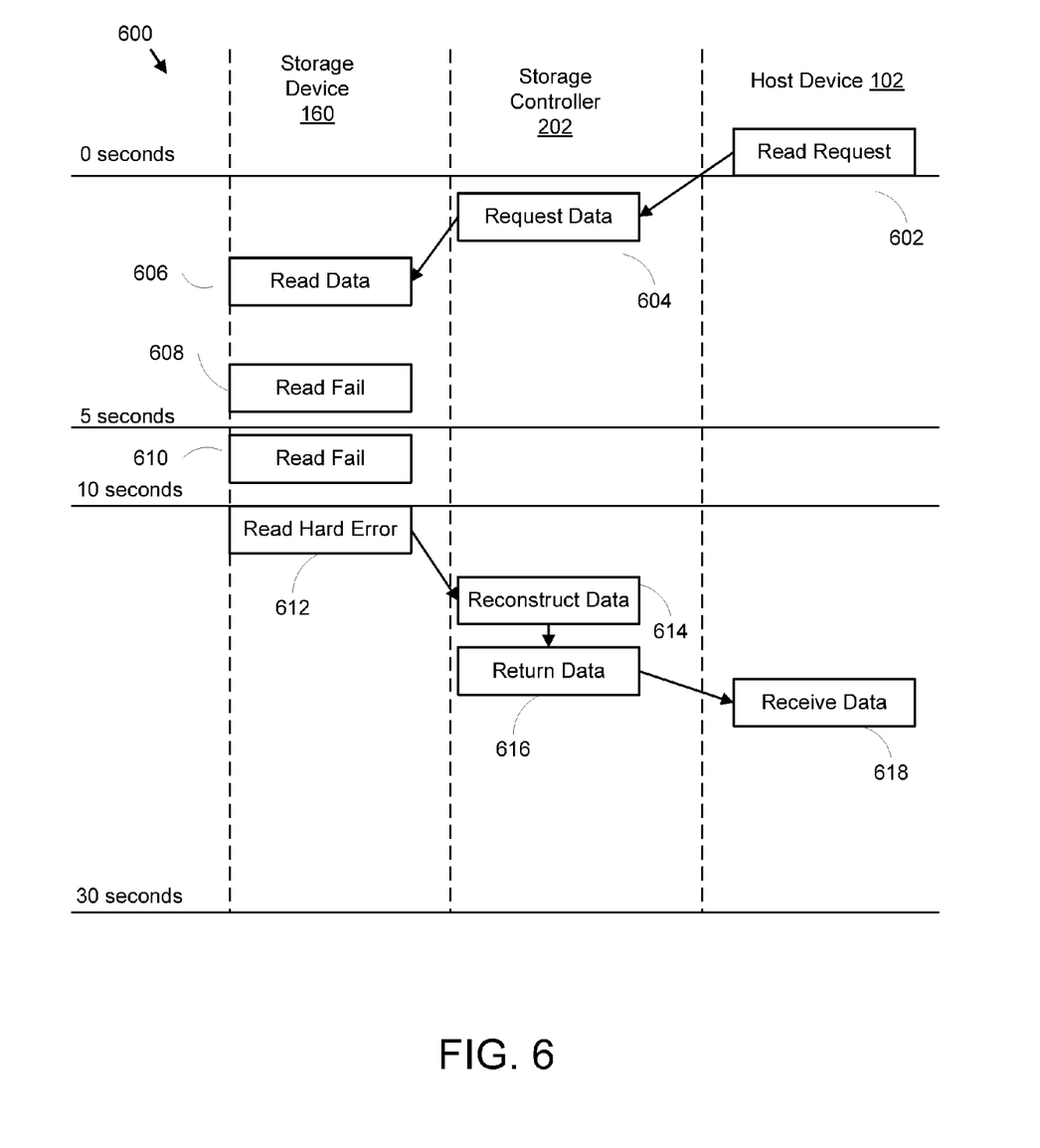
FIG. 6 is a schematic timeline diagram illustrating another method for managing errors in a RAID.

FIG. 6 is a schematic timeline diagram illustrating another method 600 for managing errors in a RAID. In one embodiment 600, at a time index of 0 seconds, a host device 102 may request 602 data at a storage controller 202. In response to a read request 602, the storage controller 202 may request 604 data from a storage device 160. The storage device 160 may attempt to read 606 the requested data. The read may fail, one or more times 608. Internal recovery procedures for the storage device 160 may take 30 seconds or longer. In one embodiment, a time-out value of 10 seconds may have been set by a configuration module 150. In consequence of the time-out value, the storage device 160 may return 612 a hard error even though the internal recovery procedures for the storage device may not have been completed. In response to receiving a hard error from the storage device 160, the storage controller 202, may reconstruct 614 the requested data, as previously described, or as one skilled in the art will appreciate. The storage controller may return 616 the requested data to the host device 102. The host device 102 may receive 618 the requested data.

Figure 7:
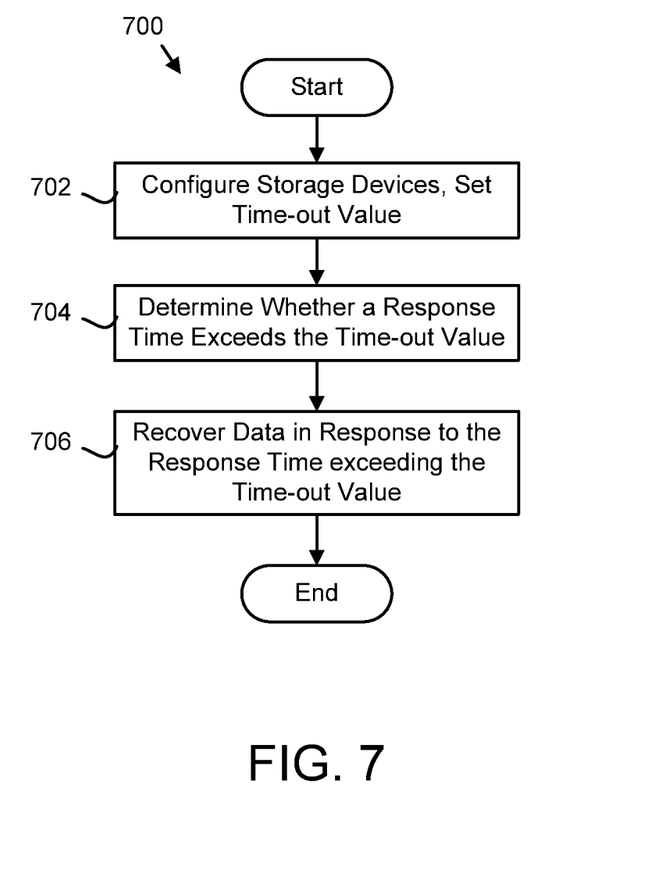
FIG. 7 is a schematic flow chart diagram illustrating one method for managing errors in a RAID.

FIG. 7 is a schematic flow chart diagram illustrating one method 700 for managing errors in a RAID. The method 700 begins and a configuration module 150 configures storage devices 160 and sets a time-out value for the storage devices 160. The configuration module 150 determines 704 whether a response time for a storage device 160 exceeds the time-out value. The configuration module 150 recovers 706 data in response to the response time for the storage device 160 exceeding the time-out value.

Figure 8:
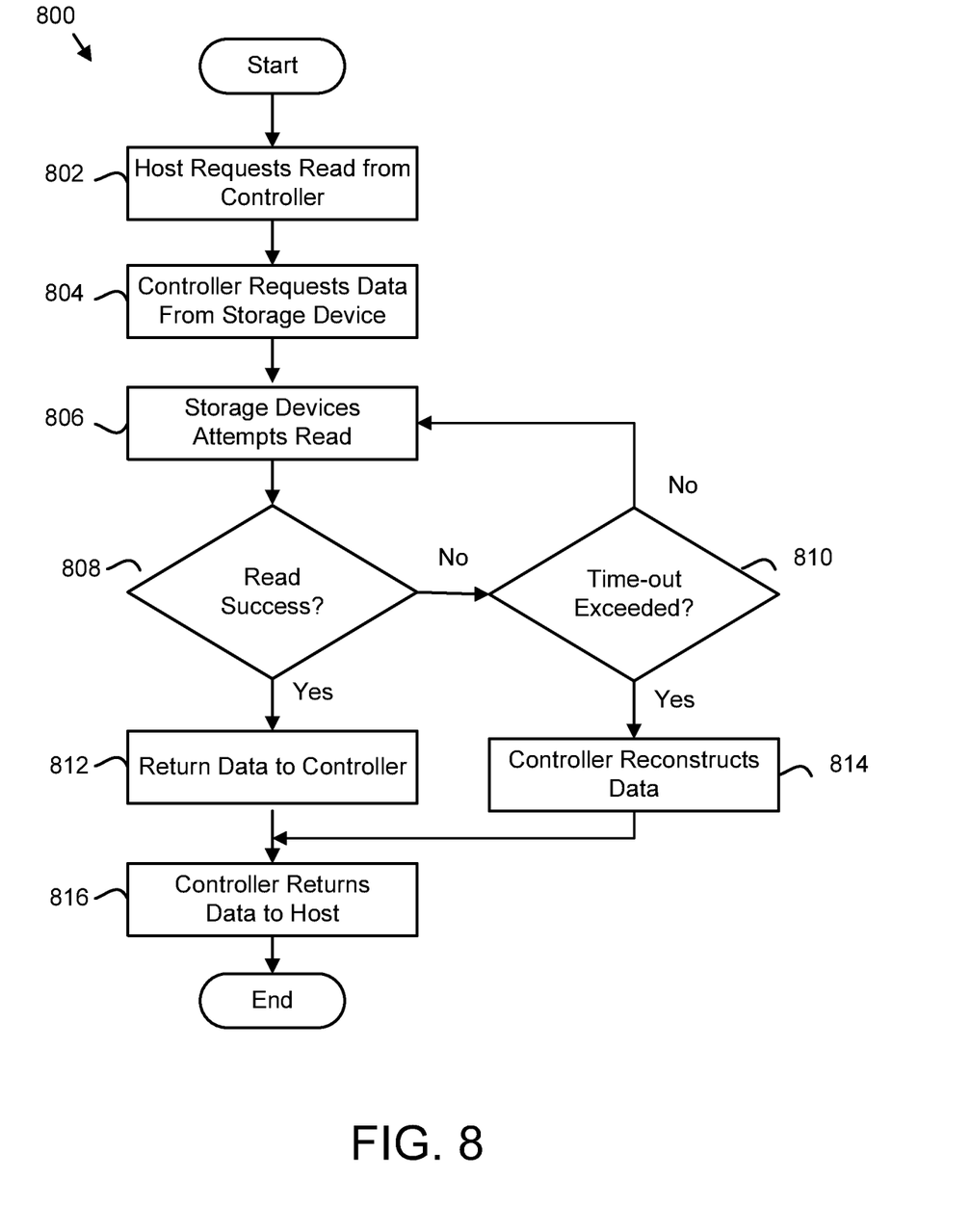
FIG. 8 is a schematic flow chart diagram illustrating another embodiment of a method for managing errors in a RAID.

FIG. 8 is a schematic flow chart diagram illustrating another embodiment 800 of a method for managing errors in a RAID. In one embodiment, the method 800 begins and a host device 102 requests 802 data from a storage controller 202. A storage controller requests 804 data from a storage device 160. A storage device attempts 806 to read the requested data. In one embodiment, if the read was not successful 808, the storage device 160 determines if a time-out value is exceeded. If not, the storage device attempts 806 to read the requested data. If the time-out value has been exceeded, a storage controller 202 may reconstruct 814 the requested data, and return 816 the requested data to the host device 102. If a read operation by a storage device was successful, the read data may be returned 812 to a storage controller 202. A storage controller 202 may return the requested data to the host device 102.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
 a processor;
 a RAID subsystem accessible by the processor; and
 a memory storing modules for execution by the processor, the modules comprising:
  a configuration module configuring a plurality of storage devices for a RAID and setting a time-out value for each of the plurality of storage devices in a register of respective storage devices, wherein the set time-out value is less than a default time-out value for the plurality of storage devices;
  a determination module determining whether a response time for a storage device of the plurality of storage devices exceeds the time-out value;
  a data recovery module that recovers data from the RAID in response to the storage device exceeding the time-out value; and
  an adjustment module that adjusts the time-out value based on a percentage of the storage devices exceeding the time-out value.

2. The apparatus of claim 1, further comprising a receiver module configured to receive the time-out value, the configuration module setting the received time-out value for the plurality of storage devices.

3. The apparatus of claim 2, wherein the receiver module receives the time-out value from a host device.

4. The apparatus of claim 1, wherein the RAID comprises one or more of RAID 0, RAID 1, RAID 2, RAID 3, RAID 4, RAID 5, RAID 6, RAID 10, and a nested RAID.

5. The apparatus of claim 1, wherein each of the plurality of storage devices comprises a storage array, each storage array being configured with a different time-out value.

6. The apparatus of claim 1, wherein the adjustment module is configured to increase the time-out in response to the determination module determining that a threshold number of the plurality of storage devices have exceeded the time-out value.

7. The apparatus of claim 1, wherein the adjustment module is configured to decrease the time-out value in response to determining that a threshold number of the plurality of storage devices have not exceeded the time-out value.

8. A method comprising:
- configuring a plurality of storage devices for a RAID subsystem, the RAID subsystem;
- setting a time-out value for each of the plurality of storage devices in a register of respective storage devices, wherein the set time-out value is less than a default time-out value for the plurality of storage devices;
- determining whether a response time for a storage device of the plurality of storage devices exceeds the time-out value; and
- recovering data from the RAID in response to the storage device exceeding the time-out value; and
- adjusting the time-out value based on a percentage of the storage devices exceeding the time-out value.

9. The method of claim 8, further comprising receiving the time-out value.

10. The method of claim 9, wherein the receiving comprises one of receiving the time-out value from a host device, and receiving the time-out value from a storage controller.

11. The method of claim 8, further comprising counting a number of times a storage device of the plurality exceeds the time-out value, and removing the storage device from the RAID in response to determining that the number of times the storage device has exceeded the time-out value is above a threshold value.

12. The method of claim 8, further comprising replacing a storage device that exceeds the time-out value one or more times.

13. The method of claim 8, wherein each of the plurality of storage devices comprises a storage array, wherein setting a time-out value for the plurality of storage devices comprises setting each storage array with a different time-out value.

14. The method of claim 8, wherein adjusting the time-out value comprises increasing the time-out value in response to determining that a threshold number of the plurality of storage devices have exceeded the time-out value.

15. The method of claim 8, wherein adjusting the time-out value comprises decreasing the time-out value in response to determining that a threshold number of the plurality of storage devices have not exceeded the time-out value.

16. A system comprising:
- a plurality of storage devices forming a RAID, the storage devices configured to receive a time-out value that is less than a default time-out value for the plurality of storage devices, the received time-out value limiting internal recovery procedures for the storage devices;
- a storage controller controlling the RAID, the storage controller configured to set a time-out value for the storage devices by storing the time-out value in a register of respective storage devices, the storage controller further configured to recover data from the RAID in response to one or more storage devices exceeding the time-out value, wherein the storage controller is further configured to adjust the time-out value based on a percentage of the storage devices exceeding the time-out value;
- a system memory; and
- one or more processor in communication with the storage controller and transferring data to the system memory.

17. The system of claim 16, wherein the storage controller is configured to receive the time-out from one of a host device, a module, a driver, a controller, an operating system, and an application.

18. The system of claim 16, wherein each of the plurality of storage devices comprises a storage array, wherein the storage controller sets each storage array with a different time-out value.

19. A program product comprising a computer readable storage medium comprising machine readable code executable by a processor, the code comprising operations to:
- configure a plurality of storage devices for a RAID subsystem;
- setting a time-out value for each of the plurality of storage devices in a register of respective storage devices, wherein the set time-out value is less than a default time-out value for the plurality of storage devices;
- determine whether a response time for a storage device of the plurality of storage devices exceeds the time-out value; and
- recover data from the RAID in response to the storage device exceeding the time-out value; and
- adjusting the time-out value based on a percentage of the storage devices exceeding the time-out value.

20. The program product of claim 19, wherein each of the plurality of storage devices comprises a storage array, the code further comprising operations to set each storage array with a different time-out value.

* * * * *